Patented Sept. 29, 1925.

1,555,640

UNITED STATES PATENT OFFICE.

DAVID T. DAY, OF WASHINGTON, DISTRICT OF COLUMBIA; ELIZABETH E. DAY EXECUTRIX OF SAID DAVID T. DAY, DECEASED.

PROCESS FOR PREPARING A FILTERING MATERIAL.

No Drawing. Application filed December 11, 1924. Serial No. 755,315.

*To all whom it may concern:*

Be it known that I, DAVID T. DAY, a citizen of the United States, residing at Washington, District of Columbia, have invented certain new and useful Improvements in Processes for Preparing a Filtering Material, of which the following is a specification.

This invention relates to the production of a filtering material from shale. Oil-bearing shales are distilled for the oils and wax they contain, and the residue that is left, is commonly treated as waste. In the process to be described, this otherwise waste material may be utilized by treating the shale, preferably during distillation so as to produce an efficient filtering material at very little expense.

The material to be treated may be any earthy material containing particles of siliceous material distributed throughout its mass. Oil-bearing shale found in some parts of California, Colorado, Utah and in some other locations, is of this character, and its porosity makes it particularly desirable in that from it may be produced a filtering material with a large adsorbing surface.

One way of carrying out the process is to mix shale, preferably a porous, siliceous oil-bearing shale, in the form of lumps or in any other form, convenient for retorting, with about 1% of its weight of sodium hydroxide in dry form. This may be done in any convenient manner, such as, for instance, by rotating the shale and soda in a horizontal rotary retort. The mixture is heated to distill off the oil, and the now commonly termed "spent shale" may be used as fuel beneath the retort so that the carbonaceous matter is then burnt out. The residue is allowed to cool and this leaves a filtering material ready for use after it is finely ground.

The process outlined may be modified by adding the alkali during or after instead of before the distillation of the oil. Either dry alkali, preferably sodium hydroxide or soda ash, or a solution thereof may be used.

It is not definitely known just what exact transformation takes place while the heating of the alkali-shale mixture is being conducted. The properties of the resultant product indicate that the silica content of the shale has been materially changed and apparently the alkali has been volatilized off.

Any alkali which is volatile at furnace temperatures will serve the purpose of the process, and there may be others which will act in the manner described.

The product has remarkably increased adsorptive properties and is better suited for refining and filtering purposes than is spent shale.

What I claim is:—

1. A process for preparing a filtering material comprising heating a mixture of shale and alkali, and grinding the resulting product.

2. A process for preparing a filtering material comprising heating a mixture of shale and sodium hydroxide, and grinding the resulting product.

3. A process for preparing a filtering material comprising heating shale supplemented with about 1% by weight of caustic soda, and grinding the resulting product.

4. A process for preparing a filtering material comprising distilling a mixture of oil shale and alkali, and grinding the residue.

5. A process for preparing a filtering material comprising distilling a mixture of oil shale and sodium hydroxide, and grinding the residue.

6. The process for preparing a filtering material comprising distilling oil shale supplemented with about 1% by weight of caustic soda, and grinding the residue.

7. A process for preparing a filtering material comprising mixing a small quantity of alkali with oil shale, subjecting the shale and alkali to a distilling treatment and burning the shale to remove the carbon.

8. A process for preparing a filtering material comprising mixing a small quantity of sodium hydroxide with oil shale, subjecting the shale and sodium hydroxide to a distilling treatment, and burning the shale to remove the carbon.

9. A process for preparing a filtering material comprising mixing 1% by weight of caustic soda with oil shale, subjecting the shale and caustic soda to a distilling treatment, and burning the shale to remove the carbon.

10. A process for preparing a filtering material comprising mixing a small quantity of alkali with oil shale of a siliceous, porous nature, subjecting the shale and alkali to a distilling treatment, burning the shale to remove the carbon, and grinding the residue.

11. A process for preparing a filtering material comprising mixing sodium hydroxide with oil shale of a siliceous, porous nature, subjecting the shale and sodium hydroxide to a distilling treatment, burning the shale to remove the carbon, and grinding the residue.

12. A process for preparing a filtering material comprising mixing 1% by weight of caustic soda with oil shale of a siliceous, porous nature, subjecting the shale and caustic soda to a distilling treatment, burning the shale to remove the carbon, and grinding the residue.

In testimony whereof I affix my signature.

DAVID T. DAY.